Figure 1:
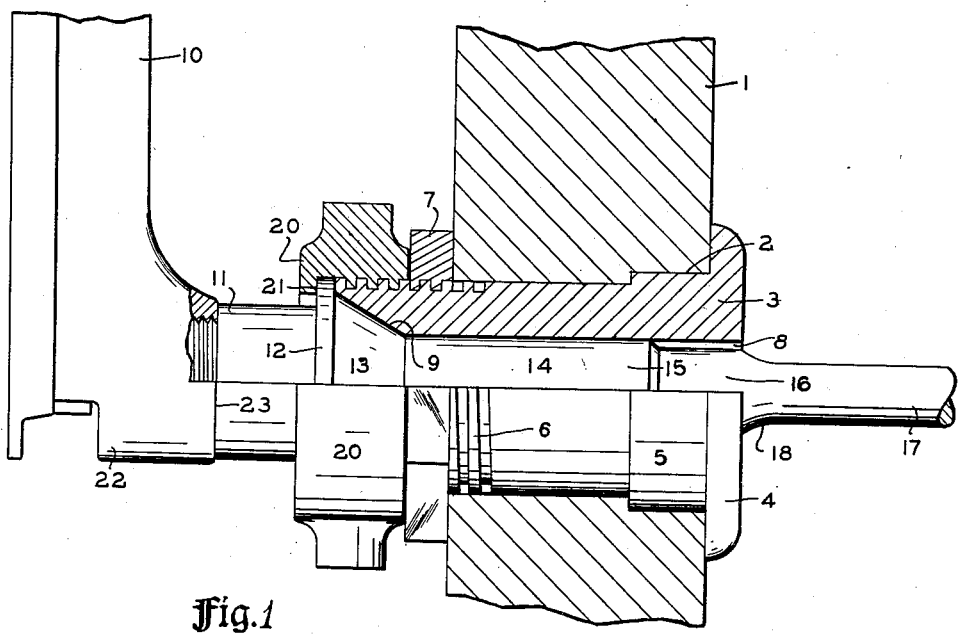

Nov. 7, 1939.   G. J. OESTREICHER   2,178,697

THERMOMETER CASING AND TANK SANITARY FITTING COMBINATION

Filed Feb. 17, 1938

INVENTOR.
GEORGE J. OESTREICHER
BY
John H. Leonard,
HIS   ATTORNEY.

Patented Nov. 7, 1939

2,178,697

UNITED STATES PATENT OFFICE 2,178,697

THERMOMETER CASING AND TANK SANITARY FITTING COMBINATION

George J. Oestreicher, Cleveland, Ohio

Application February 17, 1938, Serial No. 191,045

7 Claims. (Cl. 73—375)

This invention relates to a thermometer casing and a tank sanitary fitting combination for such tanks as require readily detachable thermometers and particularly to a device of this character for use in connection with milk tanks and other tanks containing liquids meant for human consumption.

In tanks of this character great difficulty has been encountered in providing a thermometer casing and sanitary fitting combination in which all of the parts exposed to the liquid are readily detachable for assembly, disassembly, and cleaning. Experience has demonstrated that if it is slightly arduous to remove and clean the various parts, workmen quite often omit to do so and contamination of the liquid often results from this omission. In milk tanks particularly this problem is most acute due to the fact that the milk tends to coagulate on any rough surface and particularly on screw threads and the like. Any abrupt shoulders of this nature are very difficult to clean and, after short periods of use, such shoulders and resultant corners accumulate deposits of coagulated and soured milk which render the parts unsanitary.

Again, in such devices, difficulty has been encountered in providing for proper seating of the detachable thermometer casing in the tank fitting. This improper fitting damages the seat and causes leakage. The average workman, in attempting to overcome the leakage, unduly tightens the various connections with the result that they cannot be readily detached and require so much effort to remove that they are purposely left uncleaned when the day's work is completed and the cleaning is necessary.

Finally, all present devices of this character rely on a number of sealing joints which merely increase the difficulty of maintaining the parts sealed and in sanitary condition.

The principal objects of the present invention are to provide a simplified thermometer casing and a tank sanitary fitting combination for tanks requiring thermometer casings which may be detached and cleaned readily, in which combination only one joint and seal is necessary; the seats of the thermometer casing and fitting are so arranged with respect to the remaining parts that they will be guided squarely into seating relation without danger of damage to either; the seats of the fitting and thermometer casing are arranged at the outer end of the fitting so as to be readily accessible for cleaning; all of the parts of the thermometer casing and of the fitting which are exposed to the liquid during operation are free from screw threads and abrupt shoulders, corners, and the like which can become contaminated; and the parts of the thermometer casing, when detached from the fitting, are maintained in assembled condition until deliberately disassembled by the operator.

Other objects and advantages of the invention will become apparent from the following specification, wherein reference is made to the drawing, in which—

Figure 2:
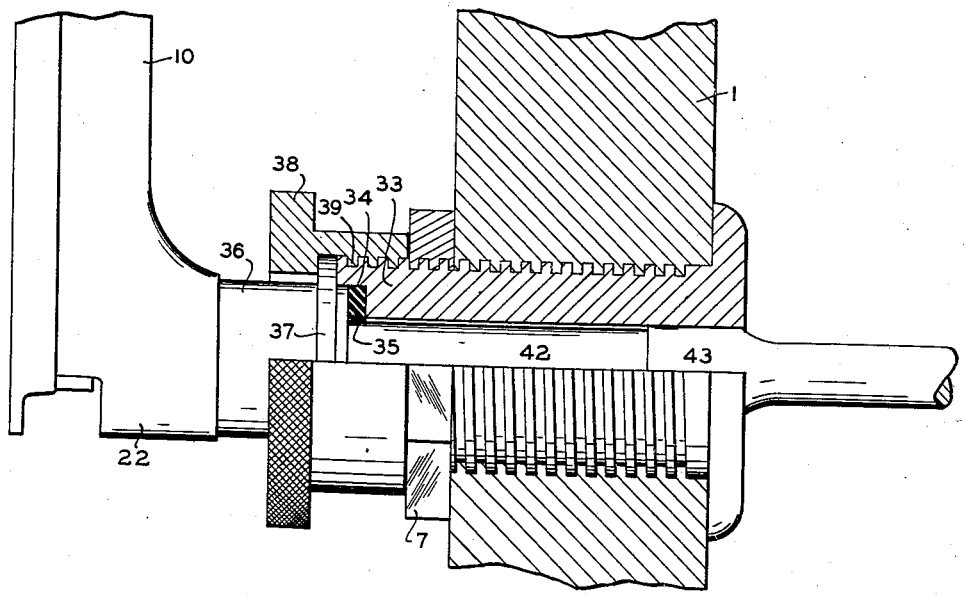

Fig. 1 is a fragmentary sectional view of a portion of a tank and sanitary fitting with the thermometer casing installed therein, a portion of the thermometer casing and attaching parts being shown in section for clearness in illustration; and Fig. 2 is a view similar to Fig. 1 illustrating a modification of the invention.

Referring to the drawing, the invention is illustrated in connection with a milk tank having a relatively thick side wall 1 in which is a passage 2 for accommodating a sanitary fitting 3.

The sanitary fitting 3 is generally tubular and of greater length than the thickness of the wall 1. The fitting 3 has an external flange portion 4 on its inner end and an enlarged centering portion 5 adjacent thereto. At its opposite end the fitting 3 has external threads 6 which are preferably of substantially square cross section and which, when the flange 4 abuts the inner wall of the tank, extend from slightly inside of the outer limit of the wall 1 of the tank outwardly a considerable distance therebeyond and entirely to the outer end of the fitting 3. A lock nut 7 is received on the threads 6 for drawing the fitting tightly into position within the passage 2. If desired, washers or gaskets can be interposed between the inner and outer surfaces of the wall 1 and the flange 4 and nut 7 respectively. The nut 7 is of such thickness that when the fitting 3 is installed in the passage 2, the threaded end portion of the fitting extends outwardly beyond the nut for connection to the thermometer device.

The fitting 3 is preferably open at both ends and has an axial passage 8 therethrough which is of substantially constant diameter for the full length of the fitting, this passage 8 being smooth, that is, free from threads, abrupt shoulders, depressions or corners of any nature. At the outer end of the fitting 3, the walls defining the passage 8 are flared outwardly toward the outermost end of the fitting to provide a seat 9.

Here it should be noted that the prior practice in connection with such fittings as the fitting 3 has been to provide a seat at the inner end of a fitting, a corresponding seat being provided on the casing of the thermometer device. This not only results in an internally exposed shoulder and corner in the innermost end portion of the fitting where it is least accessible for cleaning but also results in a seat so positioned that it is often struck by the inner end of the casing of the thermometer device when the thermometer device is installed. Then, again, in the prior structures, since the casing of the thermometer is not guided during insertion, the seats on the casing itself often strike the fitting and are damaged thereby.

In the present invention, the thermometer device, indicated at 10, is provided with a casing 11 having near its outer end an enlargement which has an annular radially extending shoulder 12 facing outwardly endwise of the casing. The enlargement is preferably integral with the casing 11 and at its opposite face is tapered to form a seat 13 which is complementary to the seat 9 and, at its inner end, merges with the intermediate body portion 14 of the casing.

This portion 14 is preferably of constant diameter and preferably of the same diameter as the passage 8 of the fitting 3, allowing only sufficient operating clearance to permit ready insertion of the casing endwise into the fitting from the outer end of the fitting. If the portion 14 is not made the same in diameter as the passage, at least a portion, such as indicated at 15, which is in spaced relation to the seat 9, is of the same diameter and is of such extent lengthwise of the casing 11 that it guides the casing and holds it in coaxial relation with the passage 8 before the seat 13 has approached and reached the seat 9 in the outermost end of the fitting 3. In such event, abrupt differences in diameter of adjacent portions are to be avoided.

When the casing 11 is in installed position with the seats 9 and 13 in sealing cooperation, the inner edge of the casing 11 extends into the inside of the tank beyond the fitting 3, the inwardly extending portions, such as indicated at 16 and 17, being such as are well known in the art. As heretofore mentioned, however, the surface portion such as 18 of the casing was heretofore used as the seat instead of the seat 13 herein provided.

Carried on the casing 11 is a ring nut 20 such as used for hose connections and which is internally threaded to cooperate with these threads 6 of the fitting 3 which are exposed outwardly beyond the nut 7. The nut has an overhanging shoulder 21 which engages with the shoulder 12 to draw the casing tightly into seating position. The thermometer body portion 22 is secured to the outer end of the casing 11 and provides a shoulder 23 which is such as to permit outward movement of the nut 20 a distance just beyond the seat 13 and yet to restrain the nut from detachment from the casing.

In the form illustrated, it is apparent that there are no abrupt shoulders and corners on either that part of the casing exposed within the fitting 3 or within the fitting passage. All screw threads are external and since the same threads that cooperate with the nut 7 to hold the fitting in place also cooperate with the nut 20, no seal is required other than that afforded by the seats 9 and 13.

In the modified form of the invention illustrated in Fig. 2, the parts are substantially the same as those heretofore described, except that the tubular fitting 33 is provided at its outer end with a counterbore 34 which receives a rubber washer 35, the rubber washer having an internal diameter slightly less than the internal diameter of the passage in the fitting 33. The casing 36, corresponding to the casing 11, has a shoulder 37 arranged for engagement with a nut 38 for drawing the casing into the fitting. The nut is also provided with screw threads 39 for engagement with the threaded outer end portion of the fitting 33.

The inner face of the shoulder 37 engages the washer 35 for compressing the washer and effecting a seal when the casing is drawn into position. A portion of the casing is slightly undercut, as indicated at 42, to provide a very slight shoulder 43 facing toward the boss 40. The washer is of such size and internal diameter as to tightly embrace the portion 42 while the portion 43 is of proper diameter to fit snugly within the passage in the fitting 33. Consequently, while the casing can be inserted readily through the washer during installation, withdrawal of the casing after insertion causes the shoulder 43 to engage the washer and pull it out of the fitting, at the same time preventing it from falling off of the casing onto the floor. The shoulder 43 is so slight that cleaning can be effected easily. Thus, all parts are kept in sufficiently assembled position as to be readily cleaned or separated, if desired. The nut 38 is of large diameter with a heavy rim portion which is knurled on its outer surface so that it can be readily loosened and unscrewed by spinning by hand without any tools.

Having thus described my invention, I claim:

1. In a thermometer and tank sanitary fitting combination for tanks requiring thermometers which may be readily detached and cleaned, a tubular fitting extending through a side wall of the tank and sealed with respect thereto and open at both ends and having an outer end portion extending beyond the tank with external threads thereon, and having a smooth axial passage therethrough, a nut in engagement with the threads for securing the fitting to the tank and being of less thickness than the length of said threaded portion, a tubular casing adapted to support a thermometer, said casing being receivable endwise within said fitting from its outer end and extending beyond the inner end of the fitting when the tubular casing is installed in the fitting, said fitting having an internal outwardly flaring seat at the outer end of the passage, a complementary seat on the tubular casing near the outer end thereof, said tubular casing having a shoulder outwardly of the casing beyond the seat and facing outwardly, a nut carried on the casing and having an opposed shoulder engageable with the shoulder of the casing, and said nut having internal threads engageable with the said threads of the fitting for drawing the casing into the fitting and effecting sealed pressure engagement of said seats.

2. In a thermometer and tank sanitary fitting combination for tanks requiring thermometers which may be readily detached and cleaned, a tubular fitting extending through a side wall of the tank and sealed with respect thereto and open at both ends and having an outer end portion extending beyond the tank, said end portion having external threads and the fitting having a smooth axial passage therethrough, a tubular casing adapted to support a thermometer, said casing being receivable endwise within said fitting from the outside of the tank and extending beyond the inner end of the fitting when the tubular casing is installed in the fitting, said fitting having an internal outwardly flaring seat at the outer end of the passage, a complementary seat on the tubular casing near the outer end thereof, said tubular casing having an external shoulder outwardly of the casing beyond the seat and facing outwardly endwise of the casing, a nut carried on the casing and having an opposed shoulder engageable with the shoulder of the casing, said nut having internal threads engageable with the said threads of the fitting for drawing the casing into the fitting and effecting sealed pressure engagement of said seats, and said casing having a portion between the seat and the inner end of the casing shaped to fit snugly and slidably in the inner end portion of said passage of the fitting for guiding the casing into the fitting prior to and during the movement of the casing to effect engagement of said seats.

3. In a thermometer and tank sanitary fitting combination for tanks requiring thermometers which may be readily detached and cleaned, a tubular fitting extending through a side wall of the tank and sealed with respect thereto and open at both ends and having an outer end portion extending beyond the tank and externally threaded and having a smooth axial passage of constant diameter therethrough, a tubular casing adapted to support a thermometer, said casing being receivable endwise within said fitting from the outside of the tank and extending beyond the inner end of the fitting when the tubular casing is installed in the fitting, said fitting having an internal outwardly flaring seat at the outer end of the passage, a complementary seat on the tubular casing near the outer end thereof, said tubular casing having a shoulder outwardly of the casing beyond the seat and facing outwardly, a nut carried on the casing and having an opposed shoulder engageable with the shoulder and casing, said nut having internal threads engageable with the threads of the fitting for drawing the casing into the fitting and effecting sealed pressure engagement of said seats, said casing having a smooth outer surface, said nut being slidably mounted on said casing outwardly beyond the shoulder, and means disposed outwardly endwise of the casing from said shoulder for arresting outward movement of the nut while permitting movement of the nut a sufficient distance to expose said seat for cleaning, and the inner diameter of said nut being substantially the same as the greatest diameter of the seat of the casing.

4. In a thermometer and tank sanitary fitting combination for tanks requiring thermometers which may be readily detached and cleaned, a tubular fitting extending through a side wall of the tank and sealed with respect thereto and open at both ends and having an outer end portion extending beyond the tank and externally threaded and having a smooth axial passage therethrough, a tubular casing adapted to support a thermometer, said casing being receivable endwise within said fitting from the outside of the tank and extending beyond the inner end of the fitting when the tubular casing is installed in the fitting, said fitting having a counterbore at the outer end of the passage accommodating a flexible washer, said casing having a flange portion facing toward the inner end of the casing and engageable with said washer, a nut carried on the casing and having a portion outwardly beyond said flange and engageable with the outer face of the flange, and said nut having internal threads engageable with said external threads on the fitting for drawing said flange portion of the casing tightly against said washer.

5. In a thermometer and tank sanitary fitting combination for tanks requiring thermometers which may be readily detached and cleaned, a tubular fitting extending through a side wall of the tank and sealed with respect thereto and open at both ends and having an outer end portion extending beyond the tank and externally threaded and having a smooth axial passage therethrough, a tubular casing adapted to support a thermometer, said casing being receivable endwise within said fitting from the outside of the tank and extending beyond the inner end of the fitting when the tubular casing is installed in the fitting, said fitting having a counterbore at the outer end of the passage accommodating a flexible washer, said casing having a flange portion facing toward the inner end of the casing and engageable with said washer, a nut carried on the casing and having a portion outwardly beyond said flange engageable with the outer end face of the flange, said nut having internal threads engageable with said external threads on the fitting for drawing said flange portion of the casing tightly against said washer, a portion of said casing inwardly from said flange portion being slightly larger than the outwardly adjacent portion, and said washer tightly embracing the casing between the flange portion and said large portion, whereby upon withdrawal of the casing from the fitting, said large portion removes the washer from the fitting and also prevents it from becoming detached accidentally from the casing.

6. In a thermometer and a tank sanitary fitting combination for tanks requiring readily detachable thermometers, a tubular fitting comprising a tubular member having an external flange on its inner end and external screw threads on its outer end portion and being insertable, outer end foremost, through a passage in a tank wall from within the tank, a nut in threaded engagement with said outer end portion and cooperating with the flange for securing the fitting to the tank, a part on the threaded portion extending outwardly beyond the nut when the nut is in final position, said fitting having a smooth axial passage extending entirely therethrough, an internal annular seat at the outer end of the passage and flaring from the passage outwardly to the outer end of the fitting, a tubular casing adapted to support a thermometer, said casing being receivable in said passage endwise, inner end foremost, from the outer end of the passage, an external annular enlargement on the casing in spaced relation to the ends thereof and having a seat complementary to and engageable with the seat of the fitting when the casing is received in the fitting, said tubular casing having a portion of substantially the same diameter as the inner end of the passage and which is spaced toward its inner end from the seat to snugly and slidably fit in the passage near the inner end of the passage, when the casing is inserted, for aligning the casing with the passage and guiding the seats squarely into fitting relation, said enlargement on the casing having an external outwardly facing shoulder, a nut on the casing having a shoulder outwardly of the shoulder of the casing and opposed thereto, and having internal threads for threaded engagement with the threads on the said part of the fitting for drawing the seats into sealing relation.

7. A sanitary fitting combination for tanks requiring thermometers which may be readily detached and cleaned, a tubular fitting extending through a side wall of the tank and sealed with respect thereto, open at both ends and having an outer end portion extending beyond the tank and externally threaded and having a smooth axial passage therethrough, a tubular casing receivable endwise within said fitting from the outside of the tank extending beyond the inner end of the fitting when the tubular casing is installed in the fitting, and in continuous peripheral engagement with the smooth axial passage for a substantial portion of the length of the passage, said fitting having an annular seat at the outer end of the passage, complementary seat forming means on the tubular casing adjacent said annular seat, said tubular casing having an annular shoulder outwardly of the casing beyond the seat and facing outwardly, and a clamping device having an opposed annular shoulder engageable with the shoulder of the casing, and internal threads engageable with the threads of the fitting for effecting sealed pressure engagement of said seat and seat forming means.

GEORGE J. OESTREICHER.